(12) United States Patent
Abe et al.

(10) Patent No.: US 11,118,089 B2
(45) Date of Patent: Sep. 14, 2021

(54) THERMALLY-CONDUCTIVE AND ELECTRICALLY-CONDUCTIVE ADHESIVE COMPOSITION

(71) Applicant: TANAKA KIKINZOKU KOGYO K.K., Tokyo (JP)

(72) Inventors: Shintaro Abe, Kanagawa (JP); Kanako Furutachi, Kanagawa (JP); Takeshi Kondo, Kanagawa (JP); Rikia Furusho, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 16/619,356

(22) PCT Filed: Jun. 6, 2018

(86) PCT No.: PCT/JP2018/021671
§ 371 (c)(1),
(2) Date: Dec. 4, 2019

(87) PCT Pub. No.: WO2018/225773
PCT Pub. Date: Dec. 13, 2018

(65) Prior Publication Data
US 2020/0157388 A1 May 21, 2020

(30) Foreign Application Priority Data

Jun. 7, 2017 (JP) .............................. JP2017-112640

(51) Int. Cl.
| C09J 9/02 | (2006.01) |
| C09J 163/00 | (2006.01) |
| C09K 5/14 | (2006.01) |
| H01B 1/22 | (2006.01) |

(52) U.S. Cl.
CPC .............. *C09J 9/02* (2013.01); *C09J 163/00* (2013.01); *C09K 5/14* (2013.01); *H01B 1/22* (2013.01)

(58) Field of Classification Search
CPC ... C09J 9/02; C09J 163/00; C09J 9/00; C09K 5/14; H01B 1/22; C08K 2201/001; C08K 2003/0806; C08G 59/4014; C08G 59/621
USPC ........................................... 252/74, 75, 514
See application file for complete search history.

(56) References Cited

U.S. PATENT DOCUMENTS

| 4,604,230 A | * | 8/1986 | Goswami | .............. C08F 283/00 |
| | | | | 252/514 |
| 4,652,398 A | * | 3/1987 | Goswami | .............. C08F 283/00 |
| | | | | 252/514 |
| 6,733,695 B2 | * | 5/2004 | Onami | ...................... H01B 1/22 |
| | | | | 106/1.19 |
| 8,088,308 B2 | * | 1/2012 | Okubo | .................... H01L 24/29 |
| | | | | 252/514 |
| 9,169,425 B2 | * | 10/2015 | Kim | ....................... C08G 59/56 |
| 10,266,730 B2 | * | 4/2019 | Furusho | .................. C09J 11/06 |
| 10,633,564 B2 | * | 4/2020 | Abe | ......................... C09J 11/04 |
| 2011/0262728 A1 | | 10/2011 | Izutani et al. | |
| 2013/0154125 A1 | * | 6/2013 | Kim | ....................... H01L 24/50 |
| | | | | 257/783 |
| 2014/0001414 A1 | * | 1/2014 | Liu | .................... C08G 59/4042 |
| | | | | 252/511 |
| 2015/0344749 A1 | * | 12/2015 | Ochi | ......................... C09J 9/02 |
| | | | | 252/75 |
| 2017/0210951 A1 | * | 7/2017 | Abe | ..................... H01L 23/3737 |
| 2018/0010020 A1 | * | 1/2018 | Furusho | .................. C09J 11/06 |
| 2021/0062047 A1 | * | 3/2021 | Ti | ........................... H01L 24/29 |

FOREIGN PATENT DOCUMENTS

| CN | 106459718 A | 2/2017 | |
| JP | H06-322350 A | 11/1994 | |
| JP | 2005-113059 A | 4/2005 | |
| JP | 2007-269959 A | 10/2007 | |
| JP | 2008-186590 A | 8/2008 | |
| JP | 2009-084510 A | 4/2009 | |
| JP | 2014-040536 A | 3/2014 | |
| JP | 2015-224329 A | 12/2015 | |
| JP | 2015-229699 A | 12/2015 | |
| KR | 10-2016-0149253 A | 12/2016 | |
| WO | WO-2015182730 A1 * | 12/2015 | ........... C08G 59/504 |

OTHER PUBLICATIONS

Official Action dated Jul. 23, 2020, issued by the German Patent Office in German Application No. 112018002911.5.
International Search Report (PCT/ISA/210) dated Sep. 4, 2018 issued by the International Searching Authority in International Application No. PCT/JP2018/021671.
Written Opinion (PCT/ISA/237) dated Sep. 4, 2018 issued by the International Searching Authority in International Application No. PCT/JP2018/021671.
International Preliminary Report on Patentability (PCT/IPEA/409) dated Jun. 20, 2019 issued by the International Searching Authority in International Application No. PCT/JP2018/021671.
Notification of Reasons for Refusal dated Feb. 10, 2021, issued by the Korean Intellectual Property Office in Korean Application No. 10-2019-7035892.

\* cited by examiner

*Primary Examiner* — Douglas J McGinty
(74) *Attorney, Agent, or Firm* — Sughrue Mion, PLLC

(57) ABSTRACT

The purpose of the present invention is to provide a thermally-conductive and electrically-conductive adhesive composition which is for use as a die bonding material and which has high heat-conducting properties and high-temperature adhesiveness. The present invention relates to a thermally-conductive and electrically-conductive adhesive composition including (A) an electrically conductive filler, (B) an epoxy resin, (C) a reactive diluent, and (D) a curing agent.

6 Claims, 1 Drawing Sheet

THERMALLY-CONDUCTIVE AND ELECTRICALLY-CONDUCTIVE ADHESIVE COMPOSITION

TECHNICAL FIELD

The present invention relates to a thermally-conductive and electrically-conductive adhesive composition.

BACKGROUND ART

Nowadays, there is a rapidly growing demand for highly functional, compact electronic components such as, for example, power devices and light-emitting diodes (LEDs). Power devices are spreading as semiconductor elements which diminish power loss and enable highly efficient power conversion, in the fields of, for example, electric vehicles, hybrid motor vehicles, and fast chargers. Power devices are expected to be increasingly demanded also in the field of new energy, such as solar power generation systems and large-capacity solar power generation systems.

Meanwhile, LED elements, which have advantages over incandescent lamps, such as long life, small size, and small power consumption, are rapidly spreading in various fields including illuminators, cell phones, liquid-crystal panels, motor vehicles, traffic signals, outdoor lamps, and image display devices.

In the trend toward size reduction and function advancement in such electronic components, the quantity of heat generated by semiconductor elements tends to increase. However, electronic components, when kept being exposed to a high-temperature environment over a long period, become unable to perform their original functions and have a shortened life. Because of this, bonding materials having high heat dissipation properties are usually used as the bonding materials for die bonding (die bonding materials) in order to efficiently dissipate the heat generated by the semiconductor elements. The bonding materials are usually required to have the function of efficiently dissipating the heat generated by the semiconductor elements by conducting the heat to the substrate and housing, although this function depends on applications. Namely, the bonding materials are desired to have high heat dissipation properties.

Since bonding materials for use in electronic components are required to have high heat dissipation properties as stated above, high-temperature lead solders containing lead in a large amount and gold-tin solders containing gold in a large amount have hitherto been used extensively. However, the high-temperature lead solders have a problem in that the solders contain lead, which is harmful to the human body. Recently, techniques for eliminating the lead have hence come to be developed enthusiastically, and investigations on substitution by a lead-free solder are being made extensively. Meanwhile, the gold-tin solders have a cost problem because the solders contain gold, which is expensive.

Under these circumstances, an isotropically electrically conductive adhesive (hereinafter referred to simply as "electrically conductive adhesive") is receiving attention as a promising alternate material usable as a substitute for high-temperature lead solders or gold-tin solders. The electrically conductive adhesive is a composite of metal particles having functions including electrical conductivity (e.g., silver, nickel, copper, aluminum, and gold) with an organic adhesive having a bonding function (e.g., an epoxy resin, silicone resin, acrylic resin, and urethane resin), and a variety of metal particles and organic adhesives are used. Such electrically conductive adhesives are liquid at room temperature and hence easy to use, are lead-free and inexpensive, and are hence a promising alternate material usable as a substitute for high-temperature lead solders and gold-tin solders. The market for the electrically conductive adhesives is expected to enlarge greatly.

Since organic adhesives as a raw material for electrically conductive adhesives basically have a lower thermal conductivity than metals, the function of dissipating heat is imparted by incorporating a thermally conductive filler. Electrically conductive adhesives having improved heat-conducting properties have hitherto been proposed. For example, Patent Document 1 proposes a highly thermally-conductive and electrically-conductive composition which at least includes 5-80% by weight pitch-based graphitized carbon fiber filler having an average fiber diameter of 0.1-30 µm, an aspect ratio of 2-100, an average fiber length of 0.2-200 µm, and a true density of 2.0-2.5 g/cc, 15-90% by weight finely particulate metallic filler having an average particle diameter of 0.001-30 µm, and 5-50% by weight binder resin, as solid components of the composition.

Patent Document 2 proposes an electrically conductive composition which includes an epoxy resin as a base resin, a phenolic curing agent as a curing agent, a urethane-modified epoxy resin as a flexibility imparter, and a powder of gold, silver, copper, iron, aluminum, aluminum nitride, alumina, crystalline silica, or the like as a thermally conductive filler.

Furthermore, in Patent Document 3 has been reported an adhesive which includes a resinous ingredient, a highly thermally conductive, fibrous filler, and a highly thermally conductive, spherical filler including at least one member selected from the group consisting of silver, gold, platinum, aluminum nitride, silicon oxide, aluminum oxide, and carbon black and in which the highly thermally conductive, fibrous filler and the highly thermally conductive, spherical filler are contained in amounts of 0.1-20 parts by volume and 10-200 parts by volume, respectively, per 100 parts by volume of the resinous ingredient.

CITATION LIST

Patent Literature

Patent Document 1: JP-A-2008-186590
Patent Document 2: JP-A-6-322350
Patent Document 3: JP-A-2009-84510

SUMMARY OF THE INVENTION

Technical Problem

In view of the current situation in which size reduction and function advancement in electronic components proceed, it is important to take an appropriate measure against high-temperature environments. However, the electrically conductive adhesives containing a resinous ingredient have a problem in that the adhesiveness thereof to the adherends is prone to decrease in high-temperature environments because the resinous ingredient is insufficient in heat resistance. Accordingly, an object of the present invention is to provide a thermally-conductive and electrically-conductive adhesive composition which is for use as a die bonding material and which has high heat-conducing properties and has high adhesiveness to adherends in high-temperature environments.

Solution to the Problem

The present inventors made investigations in order to accomplish the object and, as a result, have discovered that the problem described above can be overcome by regulating, in particular, the silver powder used as an electrically conductive filler, among ingredients for constituting a thermally-conductive and electrically-conductive adhesive composition, so that the average particle diameter and the tap density thereof are in respective specific ranges. The present invention has been thus completed.

Specifically, the present invention is as follows.

[1] A thermally-conductive and electrically-conductive adhesive composition including (A) an electrically conductive filler, (B) an epoxy resin, (C) a reactive diluent, and (D) a curing agent, wherein the electrically conductive filler (A) is a silver powder having an average particle diameter of 0.5-4.8 μm and a tap density of 5.0-8.0 g/cm$^3$, wherein the epoxy resin (B) has two or more epoxy functional groups and an aromatic ring in one molecule and is either a liquid epoxy resin or a mixture of a liquid epoxy resin and a solid epoxy resin, wherein the reactive diluent (C) includes an aliphatic hydrocarbon chain having one or more glycidyl ether functional groups therein, and wherein the curing agent (D) is a compound having two or more phenolic functional groups in one molecule or a compound having one or more imidazole groups in one molecule or a mixture of these compounds.

[2] The thermally-conductive and electrically-conductive adhesive composition according to [1], which contains, as the epoxy resin (B), 1-5% by mass of the compound having two or more epoxy functional groups in one molecule.

[3] The thermally-conductive and electrically-conductive adhesive composition according to [1] or [2], wherein the epoxy resin (B) includes a fluorene epoxy resin.

[4] The thermally-conductive and electrically-conductive adhesive composition according to any one of [1] to [3], wherein the reactive diluent (C) is a compound which includes an aliphatic hydrocarbon chain having two glycidyl ether functional groups therein.

[5] The thermally-conductive and electrically-conductive adhesive composition according to any one of [1] to [4], wherein the curing agent (D) is 2-phenyl-4,5-dihydroxymethylimidazole.

[6] The thermally-conductive and electrically-conductive adhesive composition according to any one of [1] to [5], which is liquid.

Advantageous Effects of the Invention

The thermally-conductive and electrically-conductive adhesive composition of the present invention shows high adhesiveness to adherend materials in high-temperature environments because the silver powder contained as an electrically conductive filler has a smaller average particle diameter and a higher tap density than the silver powders used in conventional thermally-conductive and electrically-conductive adhesive compositions and because the surfaces of the silver powder in the composition of the invention which come into contact with adherend materials hence have an increased area and metallic bonds are formed on the bonding surfaces. Consequently, a thermally-conductive and electrically-conductive adhesive composition having high heat-conducting properties and having high adhesiveness to adherend materials in high-temperature environments is provided at low cost by the present invention.

DESCRIPTION OF EMBODIMENTS

Figure 1:
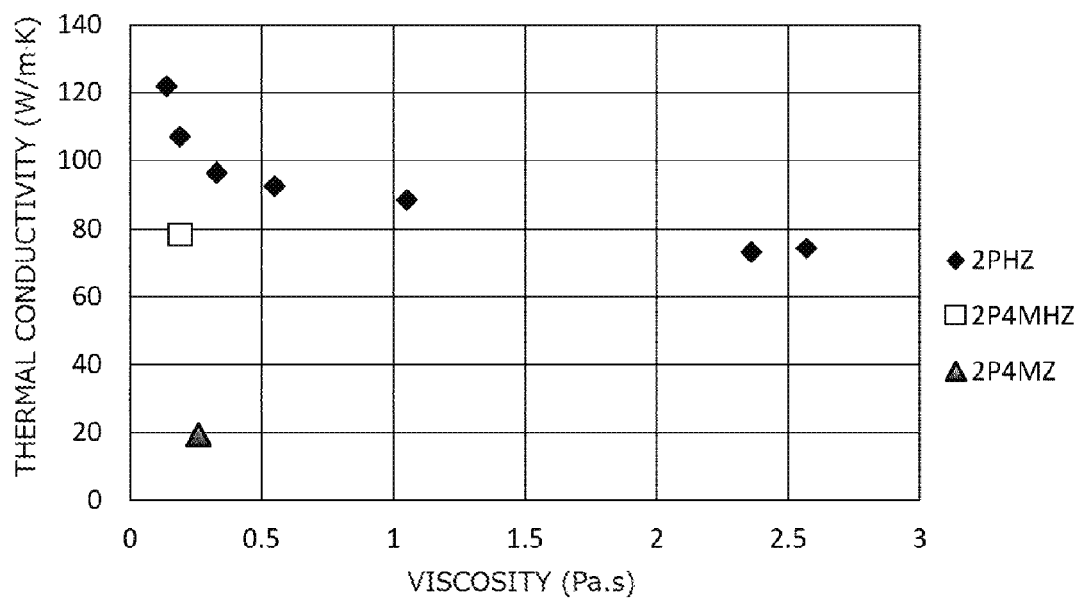
FIG. 1 is a chart showing a correlation between viscosity and thermal conductivity in thermally-conductive and electrically-conductive adhesive compositions from which the electrically conductive filler (A) and the solvent have been excluded.

The thermally-conductive and electrically-conductive adhesive composition (hereinafter referred to simply as "adhesive composition") of the present invention includes the electrically conductive filler (A), epoxy resin (B), reactive diluent (C), and curing agent (D) described above, as essential components.

The electrically conductive filler (A), epoxy resin (B), reactive diluent (C), and curing agent (D) are each explained below in detail.

[(A) Electrically Conductive Filler]

The electrically conductive filler (A) is a silver powder and has an average particle diameter of 0.5-4.8 μm, preferably 0.5-4.5 μm, more preferably 0.6-4 μm, still more preferably 0.7-4 μm, most preferably 0.8-4 μm. In case where the average particle diameter of the silver powder is less than 0.5 μm, the adhesive is not inhibited from shrinking through curing and hence undesirably comes to have reduced adhesiveness to the adherend materials. In case where the average particle diameter of the silver powder exceeds 4.8 μm, this silver powder is less apt to be sintered, resulting in insufficient bonding to the adherend materials and reduced adhesion. The values of the average particle diameter of the silver powder were determined by laser diffractometry.

In the present invention, the average particle diameter of the silver powder used as the electrically conductive filler (A) is the 50% average particle diameter (D50) of a particle diameter distribution determined with a laser diffraction/scattering particle size analyzer. For example, the average particle diameter can be determined using laser diffraction/scattering particle size analyzer MT-3000, manufactured by Nikkiso Co., Ltd.

The tap density of the silver powder is 5.0-8.0 g/cm$^3$, preferably 5.0-7.5 g/cm$^3$, more preferably 5.5-7.0 g/cm$^3$, still more preferably 5.5-6.7 g/cm$^3$. In case where the tap density of the silver powder is less than 5.0 g/cm$^3$, bonding to adherend materials by metallic bonds is insufficient. In case where the tap density of the silver powder exceeds 8.0 g/cm$^3$, the electrically-conductive composition is unstable and is prone to suffer the precipitation of the silver powder when stored over a long period. The tap density is determined, for example, through a measurement and a calculation according to JIS Z2512:2012, Metal Powder—Tap Density Measuring Method.

The silver powder used as the electrically conductive filler (A) in the present invention has a small average particle diameter as compared with conventional silver powders but has a high tap density. Because of this, the surfaces of the silver powder which come into contact with adherend materials have an increased area and metallic bonds are formed on the bonding surfaces.

The silver powder has a specific surface area of preferably 0.1-1.5 m$^2$/g, more preferably 0.3-1 m$^2$/g, still more preferably 0.5-0.8 m$^2$/g. In cases when the specific surface area of the silver powder is 0.1 m$^2$/g or larger, the surfaces of the silver powder which come into contact with adherend materials can have a sufficient area. Meanwhile, in cases when the specific surface area of the silver powder is 1.5 m$^2$/g or less, the amount of a solvent to be added to the electrically-conductive composition can be reduced.

The shape of the silver powder is not particularly limited. Examples thereof include a spherical shape, a flaky shape, a platy shape, and a dendritic shape. In general, however, a flaky shape or a spherical shape is selected. As the silver powder, use can be made of not only a pure-silver powder but also metal particles in which the surface has been coated with silver, or of a mixture of both.

Methods for producing the silver powder are not particularly limited, and examples thereof include a mechanical pulverization method, a reduction method, an electrolytic method, and a vapor-phase method. Specific examples of methods for producing a silver powder which satisfies the range of average particle diameter and the range of tap density that are specified in the present invention include the following methods (1) to (3).
(1) The silver powder is produced by an electrolytic method so as to result in a silver purity of 99-100%.
(2) The silver powder is produced by a chemical reduction method so as to result in a silver purity of 99-100%.
(3) The silver powder is produced by an atomization method so as to result in a silver purity of 99-100%.

The surface of the silver powder used as the electrically conductive filler (A) may have been coated with a coating agent. Examples of the coating agent include coating agents including a carboxylic acid. By using a coating agent including a carboxylic acid, the heat dissipation properties of the adhesive composition can be further improved.

The carboxylic acid included in the coating agent is not particularly limited, and examples thereof include monocarboxylic acids, polycarboxylic acids, and hydroxycarboxylic acids.

Examples of the monocarboxylic acids include aliphatic monocarboxylic acids having 1-24 carbon atoms, such as acetic acid, propionic acid, butyric acid, valeric acid, caprylic acid, caproic acid, capric acid, lauric acid, myristic acid, palmitic acid, stearic acid, arachidic acid, behenic acid, and lignoceric acid, unsaturated aliphatic carboxylic acids having 4-24 carbon atoms, such as oleic acid, linoleic acid, α-linolenic acid, γ-linolenic acid, dihomo-γ-linolenic acid, elaidic acid, arachidonic acid, erucic acid, nervonic acid, stearidonic acid, eicosapentaenoic acid, and docosahexaenoic acid, and aromatic monocarboxylic acids having 7-12 carbon atoms, such as benzoic acid and naphthoic acid.

Examples of the polycarboxylic acids include aliphatic polycarboxylic acids having 2-10 carbon atoms, such as oxalic acid, malonic acid, succinic acid, glutaric acid, adipic acid, azelaic acid, and sebacic acid, aliphatic unsaturated polycarboxylic acids having 4-14 carbon atoms, such as maleic acid, fumaric acid, itaconic acid, sorbic acid, and tetrahydrophthalic acid, and aromatic polycarboxylic acids such as phthalic acid and trimellitic acid.

Examples of the hydroxycarboxylic acids include aliphatic hydroxy monocarboxylic acids such as glycolic acid, lactic acid, hydroxylactic acid, and glyceric acid, aromatic hydroxy monocarboxylic acids such as salicylic acid, hydroxybenzoic acid, and gallic acid, and hydroxy polycarboxylic acids such as tartaric acid, citric acid, and malic acid.

A higher fatty acid having 10 or more carbon atoms or a derivative thereof may be incorporated into the coating agent for treating the surface of the silver powder, in order to reduce the aggregation of the silver powder. Examples of the higher fatty acid include lauric acid, myristic acid, palmitic acid, stearic acid, oleic acid, linoleic acid, linolenic acid, and lignoceric acid. Examples of the derivative of a higher fatty acid include metal salts of higher fatty acids, esters of higher fatty acids, and higher fatty acid amides.

A mixture of two or more of the carboxylic acids may be contained in the coating agent. Preferred of the carboxylic acids enumerated above are higher fatty acids which are saturated or unsaturated fatty acids having 12-24 carbon atoms.

Examples of methods for coating the surface of the silver powder with the coating agent include known methods such as a method in which the silver powder and the coating agent are stirred and kneaded together in a mixer and a method in which the silver powder is impregnated with a solution of a carboxylic acid and the solvent is volatilized.

In the adhesive composition of the present invention, another electrically conductive filler can also be used so long as the inclusion thereof does not lessen the effects of the invention. The optionally usable, electrically conductive filler is not particularly limited so long as the filler has electrical conductivity. However, a metal, carbon nanotubes, or the like is preferred. As the metal, use can be made of a powder of any of all metals handled as common conductors. Examples thereof include elemental metals such as nickel, copper, silver, gold, aluminum, chromium, platinum, palladium, tungsten, and molybdenum, alloys composed of two or more of these metals, particles coated with any of these metals, and satisfactorily electrically conductive compounds of these metals.

The content of the electrically conductive filler (A), based on the whole adhesive composition, is preferably 85-94% by mass, more preferably 88-94% by mass, still more preferably 88-93% by mass, most preferably 88-92% by mass. In cases when the content of the electrically conductive filler (A) is 85% by mass or higher, the adhesive composition comes to have an improved degree of necking, making it easy to inhibit the adhesive from shrinking through curing, and has improved heat-conducting properties and electrical conductivity and satisfactory adhesiveness to adherend materials. In cases when the content of the electrically conductive filler (A) is 94% by mass or less, the adhesive composition is apt to be pasty and has sufficient adhesiveness to adherend materials.

[(B) Epoxy Resin]

The epoxy resin (B) is one or more compounds having two or more epoxy functional groups and an aromatic ring in one molecule and includes a liquid epoxy resin. In particular, from the standpoint of crosslink density after curing, it is preferable that the epoxy resin (B) is one or more compounds having two epoxy functional groups in one molecule. Only one liquid epoxy resin may be used, or two or more liquid epoxy resins may be used in combination.

A liquid epoxy resin is a resin which is liquid at room temperature and has a viscosity at 25° C. of 0.1 Pas or higher. The epoxy resin (B) may contain a solid epoxy resin so long as the epoxy resin (B) includes a liquid epoxy resin. It is preferable that the epoxy resin consists of one or more liquid epoxy resins only. The proportion of the liquid epoxy resin(s) in the epoxy resin (B) is preferably 50% by mass or higher, more preferably 70% by mass or higher. This is because in cases when the proportion of the liquid epoxy resin(s) in the epoxy resin (B) is 50% by mass or higher, the particles of the electrically conductive filler readily come into contact with one another in the resin composition, which has a reduced viscosity, thereby attaining satisfactory electrical conductivity.

Examples of the epoxy resins include glycidyl ether type epoxy resins obtained by the condensation of epichlorohydrin with a polyhydric phenol, e.g., a bisphenol compound, or with a polyhydric alcohol, such as, for example, bisphenol A epoxy resins, brominated-bisphenol A epoxy resins, hydrogenated-bisphenol A epoxy resins, bisphenol F epoxy resins, bisphenol S epoxy resins, bisphenol AF epoxy resins, biphenyl epoxy resins, naphthalene epoxy resins, fluorene epoxy resins, novolac epoxy resins, phenol-novolac epoxy resins, o-cresol-novolac epoxy resins, dicyclopentadiene epoxy resins, bisphenol A/polyethylene oxide epoxy resins, tris(hydroxyphenyl)methane epoxy resins, and tetraphenylolethane epoxy resins, and glycidylamine type epoxy resins. Other examples include glycidyl ester type epoxy resins obtained by the condensation of epichlorohydrin with a phthalic acid derivative and a carboxylic acid, e.g., a fatty acid, and epoxy resins modified by various methods. However, the epoxy resins to be used are not limited to these examples.

Preferred of these, from the standpoint of heightening the effects of the present invention, are at least one glycidyl ether type epoxy resin selected from among bisphenol F epoxy resins, dicyclopentadiene epoxy resins, bisphenol A/polyethylene oxide epoxy resins, and fluorene epoxy resins and at least one epoxy resin selected from among glycidylamine type epoxy resins. More preferred is at least one glycidyl ether type epoxy resin selected from among bisphenol F epoxy resins, dicyclopentadiene epoxy resins, bisphenol A/polyethylene oxide epoxy resins, and fluorene epoxy resins. Most preferred are fluorene epoxy resins.

The content of the epoxy resin (B) is preferably 1-8% by mass, more preferably 1.4-3.5% by mass, based on the whole adhesive composition. In cases when the content of the epoxy resin (B) is 1% by mass or higher, the adhesive composition has an increased adhesive strength to attain improved bonding reliability. In cases when the content thereof is 8% by mass or less, a network due to the necking of the electrically conductive filler is apt to be formed and stable electrical conductivity and heat-conducting properties are obtained.

From the standpoint of crosslink density after curing, it is preferable that the adhesive composition contains a compound having two or more epoxy functional groups in one molecule, as the epoxy resin (B), in an amount of 1-5% by mass. The content of this compound is more preferably 1-4.5% by mass, still more preferably 1-4% by mass.

[(C) Reactive Diluent]

The reactive diluent (C) is one which is liquid at room temperature and has a viscosity at 25° C. of less than 0.1 Pa·s. The reactive diluent is one or more compounds each including an aliphatic hydrocarbon chain having one or more glycidyl functional groups therein. The compounds may have another polymerizable functional group besides the glycidyl functional groups. Examples of the polymerizable functional group include alkenyl groups such as vinyl and allyl and unsaturated groups such as acryloyl and methacryloyl.

The reactive diluent (C) has a molecular weight of preferably 150-600, more preferably 200-500. In cases when the molecular weight thereof is 150 or higher, this reactive diluent is prevented from volatilizing before the curing reaction proceeds, thereby attaining adhesiveness. In cases when the molecular weight thereof is 600 or less, the effect of preventing the reactive diluent from reacting too slowly is obtained.

Examples of the reactive diluent include diepoxide compounds such as ethylene glycol diglycidyl ether, propylene glycol diglycidyl ether, butanediol diglycidyl ether, neopentyl glycol diglycidyl ether, and cyclohexanedimethanol diglycidyl ether, monoepoxide compounds such as phenyl glycidyl ether, butylphenyl glycidyl ether, and glycidyl neodecanoate, and triepoxide compounds such as trimethylolpropane triglycidyl ether and glycerin triglycidyl ether. Preferred of these, from the standpoint of heightening the effects of the present invention, are neopentyl glycol diglycidyl ether, butanediol diglycidyl ether, cyclohexanedimethanol diglycidyl ether, glycidyl neodecanoate, butylphenyl glycidyl ether, and the like. The reactive diluent may be only one of these compounds or a combination of two or more thereof. As stated above, the reactive diluent is one or more compounds each including an aliphatic hydrocarbon chain having one or more glycidyl functional groups, preferably is one or more compounds each including an aliphatic hydrocarbon chain having two or more glycidyl functional groups, and most preferably is one or more compounds each including an aliphatic hydrocarbon chain having two or more glycidyl ether functional groups.

The content of the reactive diluent (C), based on the whole adhesive composition, is preferably 0.2-5% by mass, more preferably 0.5-3.5% by mass, still more preferably 1-3.2% by mass. In cases when the content of the reactive diluent (C) is 0.2% by mass or higher, the resinous ingredient is easy to disperse and the adhesive composition is even and shows improved adhesiveness to adherend materials. In cases when the content thereof is 5% by mass or less, the adhesive composition is prevented from giving cured resins which are brittle and hence have reduced adhesiveness to the adherend materials, and is also inhibited from decreasing in electrical conductivity due to a rupture.

[(D) Curing Agent]

The curing agent (D) is a compound having two or more phenolic functional groups in one molecule or a compound having one or more imidazole groups in one molecule or a mixture of these compounds.

Examples of the compound having two or more phenolic functional groups in one molecule include the following compounds.

[Chem. 1]

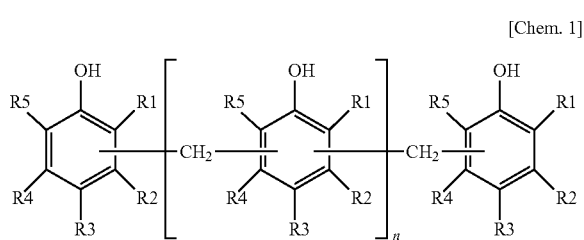

In the formula, R1 to R5 each independently represent an alkyl group having 1-5 carbon atoms, an allyl group, or a hydrogen atom. Symbol n represent an integer of 0 or larger.

As the compound having two or more phenolic functional groups in one molecule, a commercial one can be used. Examples thereof include MEH 8000 series (8000H, 8005, 8010, and 8015), manufactured by Meiwa Plastic Industries, Ltd. Preferred of these is MEH 8000H (compound of that formula in which R1 to R5 are each a hydrogen atom or an ally group and n is 0-3), from the standpoint of heightening the effects of the present invention.

Examples of the compound having one or more imidazole groups in one molecule include imidazole compounds such as 2-phenyl-4,5-dihydroxymethylimidazole, 2-phenyl-4-methyl-5-hydroxymethylimidazole, 2-phenyl-4-methylimidazole, 2-methyl-4-methylimidazole, and 1-cyano-2-ethyl-4-methylimidazole. Preferred of these is 2-phenyl-4,5-dihydroxymethylimidazole or 2-phenyl-4-methyl-5-hydroxymethylimidazole or a mixture of both, and more preferred example thereof is 2-phenyl-4,5-dihydroxymethlimidazole, from the standpoints that these compounds function as a curing agent even without the compound having two or more phenolic functional groups in one molecule, have high reaction temperatures in the range of 130-175° C., and facilitate the formation of metallic bonds at the interfaces between the adhesive composition and adherend materials, thereby attaining a high thermal conductivity and improved adhesiveness to the adherend materials in high-temperature environments.

The curing agent (D) has reaction temperatures of preferably not lower than 100° C., more preferably not lower than 110° C., still more preferably not lower than 120° C., most preferably not lower than 130° C. In cases when the reaction temperatures thereof are in a range of 100° C. and higher, this curing agent facilitates the formation of metallic bonds at the interfaces between the adhesive composition and adherend materials, thereby attaining a high thermal conductivity and improved adhesiveness to the adherend materials in high-temperature environments. Although there is no particular upper limit on the reaction temperatures thereof, the reaction temperatures are usually up to 250° C.

The content of the curing agent (D), based on the whole adhesive composition, is preferably 0.2-3% by mass, more preferably 0.2-2.5% by mass, still more preferably 0.3-2.5% by mass, most preferably 0.4-2.5% by mass. In cases when the content of the curing agent (D) is 0.2% by mass or higher, the adhesive composition is sufficiently cured to have satisfactory heat resistance and the rate of the curing of the resin is properly balanced with the rate of network formation due to the necking of the electrically conductive filler by sintering, resulting in improvements in electrical conductivity and heat-conducing property. Meanwhile, in cases when the content thereof is 3% by mass or less, not only the curing agent is prevented from remaining unreacted and thus reducing the adhesiveness to the adherend materials and the electrical properties are thereby inhibited from decreasing, but also the rate of the curing of the resin is properly balanced with the rate of network formation due to the necking of the electrically conductive filler by sintering, resulting in improvements in electrical conductivity and heat-conducing property.

[(E) Curing Accelerator]

A curing accelerator can be incorporated into the adhesive composition of the present invention. Examples of the curing accelerator include tertiary amines, triphenylphosphine compounds, urea compounds, phenols, alcohols, and carboxylic acids. Only one curing accelerator may be used, or two or more curing accelerators may be used in combination.

The amount of the curing accelerator to be incorporated is not particularly limited and may be suitably determined. However, in the case of using a curing accelerator, the amount thereof is generally 0.1-2.0% by mass based on the whole adhesive composition of the present invention.

A solvent may be incorporated into the adhesive composition of the present invention. Examples of the solvent include organic solvents such as butyl Carbitol, butyl Carbitol acetate, ethyl Carbitol, ethyl Caritol acetate, butyl Cellosolve, butyl Cellosolve acetate, ethyl Cellosolve, ethyl Cellosolve acetate, γ-butyrolactone, isophorone, glycidyl phenyl ether, and triethylene glycol dimethyl ether. Only one solvent may be used, or two or more solvents may be used in combination.

The amount of the solvent to be incorporated is not particularly limited and may be suitably determined. However, in the case of using a solvent, the amount thereof is generally 0.1-5.0% by mass based on the whole adhesive composition of the present invention.

Other additives, such as, for example, an antioxidant, ultraviolet absorber, tackifier, dispersant, coupling agent, toughening agent, and elastomer, can be suitably incorporated into the adhesive composition of the present invention so long as the incorporation thereof does not lessen the effects of the invention.

The adhesive composition of the present invention can be obtained by mixing and stirring the ingredients (A), (B), (C), and (D) described above and, according to need, ingredient (E) and other ingredients, in any desired order. Examples of dispersing methods include methods in which use is made of a two-roll mill, three-roll mill, sand mill, roll mill, ball mill, colloid mill, jet mill, bead mill, kneader, homogenizer, propeller-less mixer, or the like.

In the case of using ingredient (E), the adhesive composition of the present invention may be obtained by mixing ingredient (A) with ingredient (E) beforehand and thereafter mixing other various ingredients therewith and stirring the mixture. The thus-obtained adhesive composition has high heat-conducting properties and can exhibit heat dissipation properties.

It is preferable that the adhesive composition of the present invention is liquid. In cases when the adhesive composition is liquid, this resin composition can be made to have a reduced viscosity.

The viscosity of the thus-prepared adhesive composition excluding the electrically conductive filler (A) is measured with a rotational viscometer. In the present invention, the viscosity is measured using a cone-and-plate viscometer, as the rotational viscometer, which employs a 3°×R14 cone and a plate, at a temperature of 25° C. and at a specific rotational speed (rpm). The viscosity thereof is preferably 3 Pas or less, more preferably 2 Pas or less. By regulating the viscosity thereof to 3 Pas or less, not only a high thermal conductivity is obtained, making it easy to form electrical conduction paths, but also the adhesive composition comes to have an increased bonding strength in high-temperature environments and metallic bonds are apt to be formed between the adhesive composition and the adherend materials. There is no particular lower limit, but the viscosity is usually 0.1 Pas or higher.

The term "necking" in the present invention means that the particles of the electrically conductive filler in a cured adhesive composition are not in the state of being in mere contact with one another but in the state of having been at least partly connected to one another by sintering. The degree of necking is determined by heat-treating the adhesive composition at 200° C. for 1 hour, examining an SEM image of a vertical section of the resultant cured adhesive composition, and thereby evaluating the proportion of particles therein which are in the state of having been connected by the necking.

Examples

The present invention is explained below in more detail by reference to Examples, but the invention is not construed as being limited by the following Examples in any way.

A. Production of Adhesive Compositions

The materials shown in Table 1 were kneaded with a three-roll mill to produce each of adhesive compositions respectively having the makeups shown in Table 1 (the numeral for each material indicates the amount in % by mass based on the total mass of the adhesive composition). The materials used are as shown below. The order of kneading was such that ingredient (A) and ingredient (E) were kneaded first and the other various ingredients were subsequently added thereto and the resultant mixture was kneaded so that all the ingredients were evenly dispersed. Each adhesive composition was heated at 200° C. for 1 hour and then allowed to cool to room temperature to obtain a cured object of the adhesive composition.

(A) Electrically Conductive Fillers

Silver powder (1): average particle diameter, 4 μm; tap density, 6.7 g/cm$^3$; flaky (manufactured by Tanaka Kikinzoku Kogyo K.K.)

Silver powder (2): average particle diameter, 2 μm; tap density, 6.3 g/cm$^3$; flaky (manufactured by Tanaka Kikinzoku Kogyo K.K.)

Silver powder (3): average particle diameter, 0.8 μm; tap density, 5.5 g/cm$^3$; flaky (manufactured by Tanaka Kikinzoku Kogyo K.K.)

Silver powder (4): average particle diameter, 5 μm; tap density, 7.0 g/cm$^3$; flaky (manufactured by Tanaka Kikinzoku Kogyo K.K.)

Silver powder (5): average particle diameter, 1.0 μm; tap density, 3.5 g/cm$^3$; flaky (manufactured by Tanaka Kikinzoku Kogyo K.K.)

(B) Epoxy Resins

Epoxy resin (1): bisphenol F epoxy resin (EPICRON EXA-830CRP; manufactured by DIC Corp.; liquid at room temperature)

Epoxy resin (2): bisphenol A/polyethylene oxide epoxy resin (EP-4000S; manufactured by ADEKA; liquid at room temperature)

Epoxy resin (3): dicyclopentadiene epoxy resin (EP-4088S; manufactured by ADEKA; liquid at room temperature)

Epoxy resin (4): fluorene epoxy resin (OGSOL EG-280; manufactured by Osaka Gas Chemical; liquid at room temperature)

Epoxy resin (5): glycidylamine epoxy resin (JER630; manufactured by Mitsubishi Chemical Corp.; liquid at room temperature)

Epoxy resin (6): phenol-novolac epoxy resin (Epalloy 8330; manufactured by PTI Japan Ltd.; liquid at room temperature)

(C) Reactive Diluents

Reactive diluent (1): 1,4-cyclohexanedimethanol diglycidyl ether (molecular weight, 256) as a reactive diluent including an aliphatic hydrocarbon chain having two glycidyl ether functional groups Reactive diluent (2): neopentyl glycol diglycidyl ether (molecular weight, 216) as a reactive diluent including an aliphatic hydrocarbon chain having two glycidyl ether functional groups Reactive diluent (3): glycidyl neodecanoate (molecular weight, 228) as a reactive diluent including an aliphatic hydrocarbon chain having one glycidyl ester functional group (D) Curing Agents Curing agent (1): a compound having two or more phenolic functional groups in one molecule (MEH 8000H, manufactured by Meiwa Plastic Industries, Ltd.)

Curing agent (2): 2-phenyl-4,5-dihydroxymethylimidazole (2PHZ) (reaction temperature range, 145-175° C.)

Curing agent (3): 2-phenyl-4-methyl-5-hydroxymethylimidazole (2P4MHZ) (reaction temperature range, 130-150° C.)

Curing agent (4): 2-phenyl-4-methylmidazole (2P4MZ) (reaction temperature range, 95-125° C.)

(Solvent)

Butyl Carbitol acetate (BCA)

B. Evaluation of Properties of the Adhesive Compositions

1. Measurement of Thermal Conductivity

Each of the adhesive compositions was examined for thermal conductivity in order to evaluate the heat-conducting properties of the adhesive composition. The thermal conductivity λ (W/m·K) was determined by determining the heat diffusion "a" in accordance with ASTM-E1461 using a laser-flash-method thermal constant analyzer (TC-7000, manufactured by ULVAC-RIKO, Inc.), calculating the room-temperature specific gravity d by the pycnometer method, determining the room-temperature specific heat Cp in accordance with JIS-K7123 (year 2012) using a differential scanning calorimeter (DSC 7020, manufactured by Seiko Instruments & Electronics Ltd.), and calculating the thermal conductivity using the following equation.

$$\lambda = a \times d \times Cp$$

2. Measurement of Die Shear Strength

Each of the adhesive compositions was examined for die shear strength in order to evaluate the adhesiveness of the adhesive composition to adherend materials under a high-temperature environment. A chip having a size of 2 mm×2 mm and a thickness of 220 μm and having a bonding surface coated with silver by sputtering was die-bonded to a silver-plated surface of a copper lead frame. The adhesive composition was heated and cured under the conditions of 230° C. and 1 hour. The die shear strength of the resultant sample was measured with DAGE 4000 (manufactured by Nordson Advanced Technology).

3. Viscosity

Each adhesive composition was prepared without using the electrically conductive filler (A) and examined for viscosity. The viscosity was measured with a cone-and-plate viscometer, as a rotational viscometer, using a 3°×R14 cone and a plate at a temperature of 25° C. and a rotational speed of 5 rpm.

4. Area of Separated Portions after 2,000 Cycles in Reliability Test

A silicon chip of 2 mm×2 mm×220 μm (chip which had been surface-treated with Ti—Ni—Ag) was bonded to a Cu frame (4 mm×4 mm die pad surface-treated with Ni—Ag) using each adhesive composition, and this assembly was allowed to stand in a nitrogen atmosphere for 60 minutes in an oven kept at 230° C., thereby drying or curing the adhesive composition. Using each adhesive composition, ten samples were thus produced for a reliability test. These test samples were subjected to the reliability test under the following conditions, and an image analysis with binarization was conducted to determine the proportion (%) of the area of separated portions of the dried or cured adhesive composition layer.

Conditions for temperature cycling test: 2,000 cycles between +150° C. and −55° C.

PCT conditions: temperature, 121° C.; humidity, 100%; 0.2 MPa; 192 hours

Figure 2:
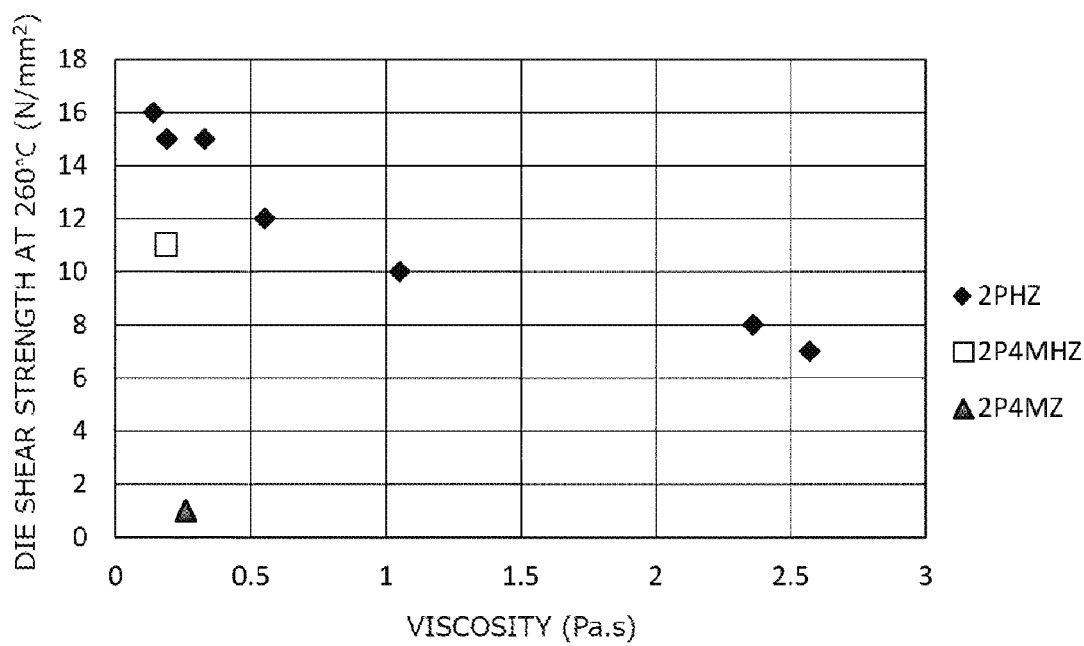
FIG. 2 is a chart showing a correlation between viscosity and die shear strength at 260° C. in thermally-conductive and electrically-conductive adhesive compositions from which the electrically conductive filler (A) and the solvent have been excluded.

The results are shown in Table 1. In Table 1, the symbol "-" means that the ingredient had not been added. In FIG. 1 is shown a chart showing a correlation between viscosity and thermal conductivity in adhesive compositions from which the electrically conductive filler (A) and the solvent have been excluded. In FIG. 2 is shown a chart showing a correlation between viscosity and die shear strength at 260° C. in adhesive compositions from which the electrically conductive filler (A) and the solvent have been excluded.

TABLE 1

|  |  |  | Example 1 | Example 2 | Example 3 | Example 4 |
|---|---|---|---|---|---|---|
| (A) Electrically conductive filler | Silver powder (1): average particle diameter, 4 μm; tap density, 6.7 g/cm³ |  | 90 | 90 | 90 | 90 |
|  | Silver powder (2): average particle diameter, 2 μm; tap density, 6.3 g/cm³ |  | — | — | — | — |
|  | Silver powder (3): average particle diameter, 0.8 μm; tap density, 5.5 g/cm³ |  | — | — | — | — |
|  | Silver powder (4): average particle diameter, 5 μm; tap density, 7.0 g/cm³ |  | — | — | — | — |
|  | Silver powder (5): average particle diameter, 1 μm; tapdensity, 3.5 g/cm³ |  | — | — | — | — |
| (B) Epoxy resin | Epoxy resin (1) | Bisphenol F (liquid) | 3.50 | — | — | — |
|  | Epoxy resin (2) | BPA-PO (liquid) | — | 3.50 | — | — |
|  | Epoxy resin (3) | DCPDM (liquid) | — | — | 3.50 | — |
|  | Epoxy resin (4) | Fluorene (liquid) | — | — | — | 3.50 |
|  | Epoxy resin (5) | Glycidylamine (liquid) | — | — | — | — |
|  | Epoxy resin (6) | Phenol-novolac (liquid) | — | — | — | — |
| (C) Reactive diluent | Reactive diluent (1) | Bifunctional | 2.10 | 2.10 | 2.10 | 2.10 |
|  | Reactive diluent (2) | Bifunctional | — | — | — | — |
|  | Reactive diluent (3) | Monofunctional | — | — | — | — |
| (D) Curing agent | Curing agent (1) | Phenol compound | 1.05 | 1.05 | 1.05 | 1.05 |
|  | Curing agent (2) | Imidazole compound, 2PHZ | 0.35 | 0.35 | 0.35 | 0.35 |
|  | Curing agent (3) | Imidazole compound, 2P4MHZ | — | — | — | — |
|  | Curing agent (4) | Imidazole compound 2P4MZ | — | — | — | — |
| Solvent | BCA |  | 3.00 | 3.00 | 3.00 | 3.00 |
| Viscosity of (B) + (C) + (D): E-type viscometer, 5 rpm |  | Pa · s | 0.19 | 0.38 | 0.17 | 0.28 |
| Thermal conductivity |  | W/mK | 95 | 79 | 92 | 75 |
| 2 × 2 mm die shear strength | At room temperature (N) | N/mm² | 48 | 38 | 50 | 35 |
|  | At 260° C. (N) | N/mm² | 17 | 10 | 18 | 12 |
| Area of separated portions after 2,000 cycles in reliability test |  | % | 4 | 3 | 8 | 2 |

|  |  |  | Example 5 | Example 6 | Example 7 | Example 8 |
|---|---|---|---|---|---|---|
| (A) Electrically conductive filler | Silver powder (1): average particle diameter, 4 μm; tap density, 6.7 g/cm³ |  | 90 | 90 | 90 | 90 |
|  | Silver powder (2): average particle diameter, 2 μm; tap density, 6.3 g/cm³ |  | — | — | — | — |
|  | Silver powder (3): average particle diameter, 0.8 μm; tap density, 5.5 g/cm³ |  | — | — | — | — |
|  | Silver powder (4): average particle diameter, 5 μm; tap density, 7.0 g/cm³ |  | — | — | — | — |
|  | Silver powder (5): average particle diameter, 1 μm; tapdensity, 3.5 g/cm³ |  | — | — | — | — |
| (B) Epoxy resin | Epoxy resin (1) | Bisphenol F (liquid) | 3.50 | 3.50 | 3.50 | 3.50 |
|  | Epoxy resin (2) | BPA-PO (liquid) | — | — | — | — |
|  | Epoxy resin (3) | DCPDM (liquid) | — | — | — | — |
|  | Epoxy resin (4) | Fluorene (liquid) | — | — | — | — |
|  | Epoxy resin (5) | Glycidylamine (liquid) | — | 1.05 | — | — |
|  | Epoxy resin (6) | Phenol-novolac (liquid) | — | — | 1.05 | — |
| (C) Reactive diluent | Reactive diluent (1) | Bifunctional | — | 1.05 | 1.05 | 2.10 |
|  | Reactive diluent (2) | Bifunctional | 2.10 | — | — | — |
|  | Reactive diluent (3) | Monofunctional | — | — | — | — |
| (D) Curing agent | Curing agent (1) | Phenol compound | 1.05 | 1.05 | 1.05 | 1.30 |
|  | Curing agent (2) | Imidazole compound, 2PHZ | 0.35 | 0.35 | 0.35 | 0.10 |
|  | Curing agent (3) | Imidazole compound, 2P4MHZ | — | — | — | — |
|  | Curing agent (4) | Imidazole compound 2P4MZ | — | — | — | — |

TABLE 1-continued

| | | | | | | |
|---|---|---|---|---|---|---|
| Solvent | | BCA | 3.00 | 3.00 | 3.00 | 3.00 |
| Viscosity of (B) + (C) + (D): E-type viscometer, 5 rpm | | Pa · s | 0.25 | 0.42 | 1.05 | 0.17 |
| Thermal conductivity | | W/mK | 80 | 67 | 51 | 93 |
| 2 × 2 mm die shear strength | At room temperature (N) | N/mm² | 48 | 60 | 55 | 37 |
| | At 260° C. (N) | N/mm² | 15 | 15 | 10 | 15 |
| Area of separated portions after 2,000 cycles in reliability test | | % | 4 | 3 | 2 | 7 |

TABLE 2

| | | | Example 9 | Example 10 | Example 11 | Example 12 |
|---|---|---|---|---|---|---|
| (A) Electrically conductive filler | Silver powder (1): average particle diameter, 4 μm; tap density, 6.7 g/cm³ | | 90 | 90 | 90 | 90 |
| | Silver powder (2): average particle diameter, 2 μm; tap density, 6.3 g/cm³ | | — | — | — | — |
| | Silver powder (3): average particle diameter, 0.8 μm; tap density, 5.5 g/cm³ | | — | — | — | — |
| | Silver powder (4): average particle diameter, 5 μm; tap density, 7.0 g/cm³ | | — | — | — | — |
| | Silver powder (5): average particle diameter, 1 μm; tap density, 3.5 g/cm³ | | — | — | — | — |
| (B) Epoxy resin | Epoxy resin (1) | Bisphenol F (liquid) | 4.48 | 3.50 | 3.50 | — |
| | Epoxy resin (2) | BPA-PO (liquid) | — | — | — | — |
| | Epoxy resin (3) | DCPDM (liquid) | — | — | — | — |
| | Epoxy resin (4) | Fluorene (liquid) | — | — | — | 3.50 |
| | Epoxy resin (5) | Glycidylamine (liquid) | — | — | — | — |
| | Epoxy resin (6) | Phenol-novolac (liquid) | — | — | — | — |
| (C) Reactive diluent | Reactive diluent (1) | Bifunctional | 2.10 | 1.05 | 2.10 | 2.10 |
| | Reactive diluent (2) | Bifunctional | — | — | — | — |
| | Reactive diluent (3) | Monofunctional | — | — | 3.00 | 3.00 |
| (D) Curing agent | Curing agent (1) | Phenol compound | — | 2.10 | 1.05 | 1.05 |
| | Curing agent (2) | Imidazole compound, 2PHZ | 0.42 | 0.35 | 0.35 | 0.35 |
| | Curing agent (3) | Imidazole compound, 2P4MHZ | — | — | — | — |
| | Curing agent (4) | Imidazole compound 2P4MZ | — | — | — | — |
| Solvent | | BCA | 3.00 | 3.00 | — | — |
| Viscosity of (B) + (C) + (D): E-type viscometer, 5 rpm | | Pa · s | 0.14 | 0.52 | 0.1 | 0.11 |
| Thermal conductivity | | W/mK | 103 | 56 | 85 | 70 |
| 2 × 2 mm die shear strength | At room temperature (N) | N/mm² | 56 | 48 | 48 | 30 |
| | At 260° C. (N) | N/mm² | 18 | 10 | 14 | 11 |
| Area of separated portions after 2,000 cycles in reliability test | | % | 8 | 7 | 5 | 1 |

| | | | Example 13 | Example 14 | Example 15 | Example 16 |
|---|---|---|---|---|---|---|
| (A) Electrically conductive filler | Silver powder (1): average particle diameter, 4 μm; tap density, 6.7 g/cm³ | | 90 | 88 | 92 | — |
| | Silver powder (2): average particle diameter, 2 μm; tap density, 6.3 g/cm³ | | — | — | — | 90 |
| | Silver powder (3): average particle diameter, 0.8 μm; tap density, 5.5 g/cm³ | | — | — | — | — |
| | Silver powder (4): average particle diameter, 5 μm; tap density, 7.0 g/cm³ | | — | — | — | — |
| | Silver powder (5): average particle diameter, 1 μm; tap density, 3.5 g/cm³ | | — | — | — | — |
| (B) Epoxy resin | Epoxy resin (1) | Bisphenol F (liquid) | — | 3.68 | 1.40 | 3.50 |
| | Epoxy resin (2) | BPA-PO (liquid) | — | — | — | — |
| | Epoxy resin (3) | DCPDM (liquid) | — | — | — | — |
| | Epoxy resin (4) | Fluorene (liquid) | 2.50 | — | — | — |
| | Epoxy resin (5) | Glycidylamine (liquid) | 0.50 | — | — | — |
| | Epoxy resin (6) | Phenol-novolac (liquid) | 0.50 | 1.58 | 0.60 | — |
| (C) Reactive diluent | Reactive diluent (1) | Bifunctional | 2.10 | 3.15 | 1.20 | 2.10 |
| | Reactive diluent (2) | Bifunctional | — | — | — | — |
| | Reactive diluent (3) | Monofunctional | 3.00 | — | — | — |

TABLE 2-continued

| | | | | | | |
|---|---|---|---|---|---|---|
| (D) Curing agent | Curing agent (1) | Phenol compound | | 1.05 | 1.58 | 0.60 | 1.05 |
| | Curing agent (2) | Imidazole compound, 2PHZ | | 0.35 | 0.53 | 0.20 | 0.35 |
| | Curing agent (3) | Imidazole compound, 2P4MHZ | | — | — | — | — |
| | Curing agent (4) | Imidazole compound 2P4MZ | | — | — | — | — |
| Solvent | | BCA | | — | 1.50 | 4.00 | 3.00 |
| Viscosity of (B) + (C) + (D): E-type viscometer, 5 rpm | | | Pa · s | 0.14 | 0.33 | 0.33 | 0.19 |
| Thermal conductivity | | | W/mK | 75 | 55 | 153 | 60 |
| 2 × 2 mm die shear strength | At room temperature (N) | | N/mm² | 35 | 42 | 45 | 54 |
| | At 260° C. (N) | | N/mm² | 12 | 11 | 18 | 9 |
| Area of separated portions after 2,000 cycles in reliability test | | | % | 1 | 3 | 7 | 5 |

TABLE 3

| | | | Example 17 | Example 18 | Example 19 | Comparative Example 1 |
|---|---|---|---|---|---|---|
| (A) Electrically conductive filler | Silver powder (1): average particle diameter, 4 μm; tap density, 6.7 g/cm³ | | — | 90 | 90 | 90 |
| | Silver powder (2): average particle diameter, 2 μm; tap density, 6.3 g/cm³ | | — | — | — | — |
| | Silver powder (3): average particle diameter, 0.8 μm; tap density, 5.5 g/cm³ | | 90 | — | — | — |
| | Silver powder (4): average particle diameter, 5 μm; tap density, 7.0 g/cm³ | | — | — | — | — |
| | Silver powder (5): average particle diameter, 1 μm; tap density, 3.5 g/cm³ | | — | — | — | — |
| (B) Epoxy resin | Epoxy resin (1) | Bisphenol F (liquid) | 3.50 | 3.50 | 3.50 | 5.60 |
| | Epoxy resin (2) | BPA-PO (liquid) | — | — | — | — |
| | Epoxy resin (3) | DCPDM (liquid) | — | — | — | — |
| | Epoxy resin (4) | Fluorene (liquid) | — | — | — | — |
| | Epoxy resin (5) | Glycidylamine (liquid) | — | — | — | — |
| | Epoxy resin (6) | Phenol-novolac (liquid) | — | — | — | — |
| (C) Reactive diluent | Reactive diluent (1) | Bifunctional | 2.10 | 2.10 | 2.10 | — |
| | Reactive diluent (2) | Bifunctional | — | — | — | — |
| | Reactive diluent (3) | Monofunctional | — | — | — | — |
| (D) Curing agent | Curing agent (1) | Phenol compound | 1.05 | 1.05 | 1.05 | 1.05 |
| | Curing agent (2) | Imidazole compound, 2PHZ | 0.35 | — | — | 0.35 |
| | Curing agent (3) | Imidazole compound, 2P4MHZ | — | 0.35 | — | — |
| | Curing agent (4) | Imidazole compound 2P4MZ | — | — | 0.35 | — |
| Solvent | | BCA | 3.00 | 3.00 | 3.00 | 3.00 |
| Viscosity of (B) + (C) + (D): E-type viscometer, 5 rpm | | Pa · s | 0.19 | 0.19 | 0.19 | 2.57 |
| Thermal conductivity | | W/mK | 105 | 52 | 5 | 15 |
| 2 × 2 mm die shear strength | At room temperature (N) | N/mm² | 51 | 45 | 41 | 42 |
| | At 260° C. (N) | N/mm² | 19 | 11 | 3 | 2 |
| Area of separated portions after 2,000 cycles in reliability test | | % | 7 | 9 | 32 | 56 |

| | | | Comparative Example 2 | Comparative Example 3 | Comparative Example 4 |
|---|---|---|---|---|---|
| (A) Electrically conductive filler | Silver powder (1): average particle diameter, 4 μm; tap density, 6.7 g/cm³ | | 90 | — | — |
| | Silver powder (2): average particle diameter, 2 μm; tap density, 6.3 g/cm³ | | — | — | — |
| | Silver powder (3): average particle diameter, 0.8 μm; tap density, 5.5 g/cm³ | | — | — | — |
| | Silver powder (4): average particle diameter, 5 μm; tap density, 7.0 g/cm³ | | — | 90 | — |
| | Silver powder (5): average particle diameter, 1 μm; tap density, 3.5 g/cm³ | | — | — | 90 |
| (B) Epoxy resin | Epoxy resin (1) | Bisphenol F (liquid) | — | 3.50 | 3.50 |
| | Epoxy resin (2) | BPA-PO (liquid) | — | — | — |
| | Epoxy resin (3) | DCPDM (liquid) | — | — | — |
| | Epoxy resin (4) | Fluorene (liquid) | — | — | — |

TABLE 3-continued

|  |  |  |  |  |  |
|---|---|---|---|---|---|
|  | Epoxy resin (5) | Glycidylamine (liquid) | — | — | — |
|  | Epoxy resin (6) | Phenol-novolac (liquid) | 3.50 | — | — |
| (C) Reactive diluent | Reactive diluent (1) | Bifunctional | 2.10 | 2.10 | 2.10 |
|  | Reactive diluent (2) | Bifunctional | — | — | — |
|  | Reactive diluent (3) | Monofunctional | — | — | — |
| (D) Curing agent | Curing agent (1) | Phenol compound | 1.05 | 1.05 | 1.05 |
|  | Curing agent (2) | Imidazole compound, 2PHZ | — | — | — |
|  | Curing agent (3) | Imidazole compound, 2P4MHZ | — | — | — |
|  | Curing agent (4) | Imidazole compound 2P4MZ | 0.35 | 0.35 | 0.35 |
| Solvent |  | BCA | 3.00 | 3.00 | 3.00 |
| Viscosity of (B) + (C) + (D): E-type viscometer, 5 rpm |  | Pa·s | 10.5 | 0.19 | 0.19 |
| Thermal conductivity |  | W/mK | 2 | 11 | 8 |
| 2 × 2 mm die shear strength | At room temperature (N) | N/mm² | 51 | 29 | 32 |
|  | At 260° C. (N) | N/mm² | 2 | 4 | 5 |
| Area of separated portions after 2,000 cycles in reliability test |  | % | 100 | 100 | 100 |

As Table 1 shows, Examples 1 to 19, which were adhesive compositions according to the present invention, each had a low proportion of the area of separated portions after 2,000 cycles in the reliability test and had a satisfactory 260° C. die shear strength and a satisfactory thermal conductivity, as compared with the adhesive compositions of Comparative Examples 1 to 4. It was ascertained from these results that the adhesive compositions of the present invention had high heat-conducting properties and had high adhesiveness to adherend materials in high-temperature environments.

It can be seen from FIG. 1 that in cases when adhesive compositions from which the electrically conductive filler and the solvent have been excluded have a viscosity as low as 0.1-3 Pa·s, the adhesive compositions are apt to have a heightened thermal conductivity and electrical conduction paths are apt to be formed. Furthermore, it can be seen from FIG. 2 that in cases when adhesive compositions from which the electrically conductive filler (A) and the solvent have been excluded have a viscosity as low as 0.1-2 Pa·s, the adhesive compositions come to have a high high-temperature die shear strength and are apt to form metallic bonds at the interfaces between the adhesive compositions and adherend materials.

It can also be seen from FIG. 1 and FIG. 2 that the incorporation of curing agents having high reaction temperatures in the range of 130-175° C. results in higher thermal conductivities and higher high-temperature die shear strengths than the incorporation of a curing agent having low reaction temperatures.

While the invention has been described in detail and with reference to specific embodiments thereof, it will be apparent to one skilled in the art that various changes and modifications can be made therein without departing from the spirit and scope thereof. This application is based on a Japanese patent application filed on Jun. 7, 2017 (Application No. 2017-112640), the contents thereof being incorporated herein by reference. All the references cited herein are incorporated herein.

The invention claimed is:

1. A thermally-conductive and electrically-conductive adhesive composition comprising (A) an electrically conductive filler, (B) an epoxy resin, (C) a reactive diluent, and (D) a curing agent, wherein the electrically conductive filler (A) is a silver powder having an average particle diameter of 0.5-4.8 μm and a tap density of 5.0-8.0 g/cm³, wherein the epoxy resin (B) has two or more epoxy functional groups and an aromatic ring in one molecule and is either a liquid epoxy resin or a mixture of a liquid epoxy resin and a solid epoxy resin, wherein the reactive diluent (C) includes an aliphatic hydrocarbon chain having one or more glycidyl functional groups therein, wherein the curing agent (D) is either a compound having one or more imidazole groups in one molecule and having a reaction temperature range of 130-175° C. or a mixture of said compound and a compound having two or more phenolic functional groups in one molecule, and wherein the viscosity of a combination of the epoxy resin (B), the reactive diluent (C), and the curing agent (D) is 0.1 to 2 Pa·s.

2. The thermally-conductive and electrically-conductive adhesive composition according to claim 1, which contains, as the epoxy resin (B), 1-5% by mass of the compound having two or more epoxy functional groups in one molecule.

3. The thermally-conductive and electrically-conductive adhesive composition according to claim 1, wherein the epoxy resin (B) comprises a fluorene epoxy resin.

4. The thermally-conductive and electrically-conductive adhesive composition according to claim 1, wherein the reactive diluent (C) is a compound which includes an aliphatic hydrocarbon chain having two glycidyl ether functional groups therein.

5. The thermally-conductive and electrically-conductive adhesive composition according to claim 1, wherein the curing agent (D) is 2-phenyl-4,5-dihydroxymethylimidazole.

6. The thermally-conductive and electrically-conductive adhesive composition according to claim 1, which is liquid.

* * * * *